United States Patent [19]

Noda et al.

[11] 3,739,079

[45] June 12, 1973

[54] COLOR TELEVISION CAMERA USING ONLY TWO CAMERA TUBES

[75] Inventors: Toshimasa Noda; Masafumi Hanaoka; Akiyoshi Kouno, all of Tokyo, Japan

[73] Assignee: Nippon Electric Company, Limited, Tokyo, Japan

[22] Filed: Sept. 21, 1971

[21] Appl. No.: 182,353

[30] Foreign Application Priority Data

| | | |
|---|---|---|
| Apr. 30, 1971 | Japan | 46/29196 |
| Sept. 22, 1970 | Japan | 45/83589 |
| Nov. 13, 1970 | Japan | 45/100386 |
| Nov. 13, 1970 | Japan | 45/113443 |

[52] U.S. Cl. .................. 178/5.4 ST

[51] Int. Cl. .................. H04n 9/08

[58] Field of Search .................. 178/5.4 R, 5.4 ST; 250/211 R, 211 J

[56] References Cited

UNITED STATES PATENTS

| | | | |
|---|---|---|---|
| 3,403,284 | 9/1968 | Buck et al. | 250/211 J X |
| 3,576,392 | 4/1971 | Hofstein | 178/7.1 |
| 3,617,753 | 11/1971 | Kato et al. | 250/211 J |

*Primary Examiner*—Robert L. Richardson
*Attorney*—Sandoe, Hopgood & Calimafde

[57] ABSTRACT

A color television camera employs only two camera tubes. One tube is a color pick-up tube for obtaining a chrominance signal comprising individual signals corresponding to respective two color components of the three primary colors, and the other of which is an image pick-up tube for obtaining a luminance signal. A target for the color pick-up tube comprises a photo-diode-array-type target, and includes apparatus for color separation disposed at the surface of the target on which light is projected, such that the camera optical system may be simplified.

13 Claims, 38 Drawing Figures

Figures 1A, 1B, 2:
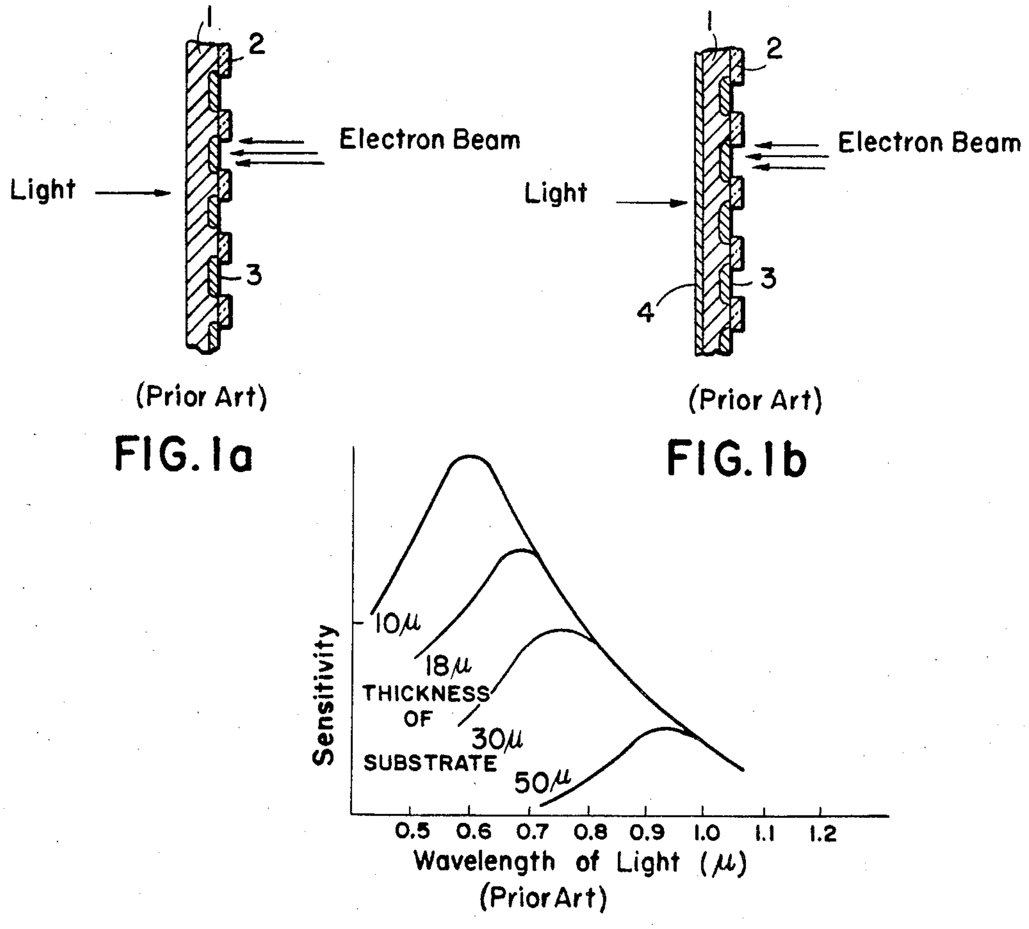

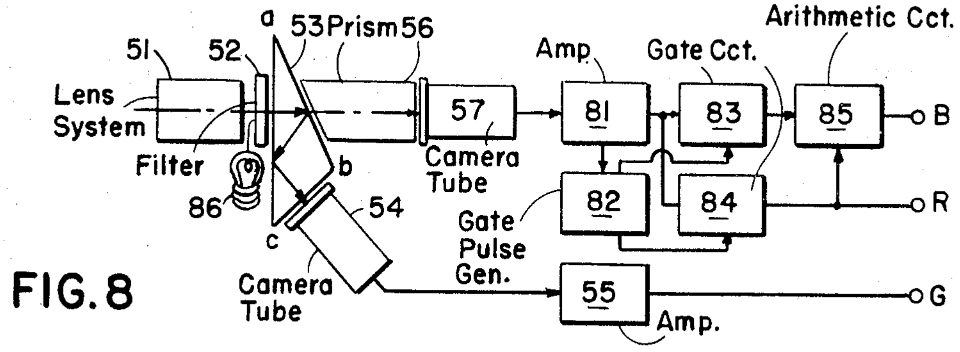
FIG. 8
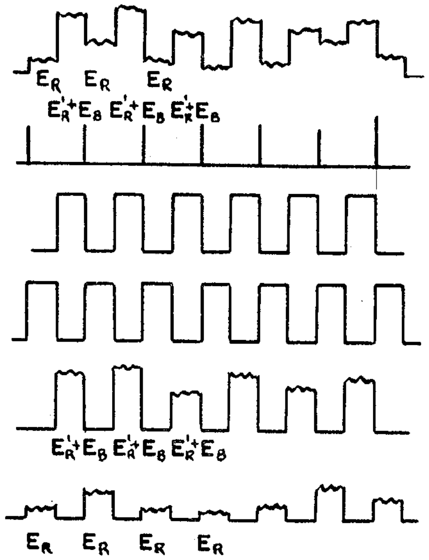
FIG. 9a
FIG. 9b
FIG. 9c
FIG. 9d
FIG. 9e
FIG. 9f
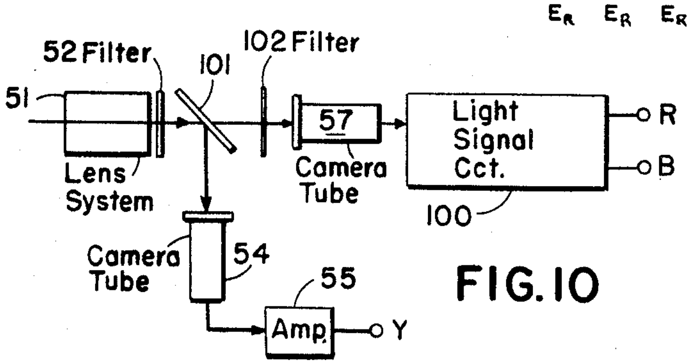
FIG. 10
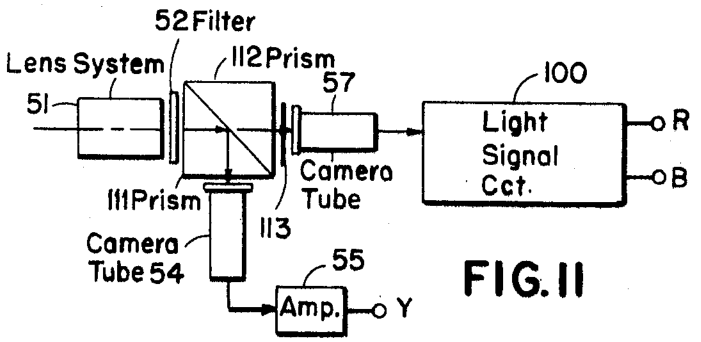
FIG. 11

COLOR TELEVISION CAMERA USING ONLY TWO CAMERA TUBES

DISCLOSURE OF INVENTION

BACKGROUND OF THE INVENTION

This invention relates to color television cameras and, more specifically, to such cameras adapted to produce so-called luminance and chrominance signals required for the transmission of pictures in color.

Known color television cameras are classified into two types. In in one form of camera, the luminance signal is developed from three primary color signals. In the other the luminance signal is produced from a camera tube for signal.

In a known color television camera of latter type, light originating from an object is divided in two by prisms or the like. One portion of the irradiant light is projected onto a camera tube for forming a luminance signal. The other light portion is split by band separation filter structure such as dichroic mirrors into light components corresponding to three primary colors. The light components are projected onto respective camera tubes corresponding to three primary color channels, so that luminance and chrominance signals are produced.

In a further known color television camera of latter type, light from an object is devided in two, one portion thereof being projected onto a camera tube for developing a luminance signal. the other portion of the irradiant light is projected onto a color pick-up tube through filter apparatus comprising red, blue, green and black stripe filters disposed side by side to produce a spot sequential signal, respective color signals corresponding to three primary colors being taken from the spot sequential signal by a sampling procedure using the black signal as an index or reference signal.

In these known color television cameras, color separation is completed in an optical system and accordingly, the optical system is very complicated; very difficult to manufacture; suffers a very great light loss due to the use of various elements in the light path; and is very susceptible to interference with spurious signals such as flare due to the multi-reflections of light, ghosts, or the like.

OBJECTS OF THE INVENTION

It is an object of this invention to provide a color television camera comprising only two camera tubes and a simple optical system, without the above described disadvantages.

Another object of this invention is to provide an improved target used in a pick-up camera tube in order to realize the above object.

SUMMARY OF THE INVENTION

According to this invention, a photo-diode array target to effect a color separation function is obtained by providing a plurality of high concentration regions of the same conduction type as a substrate of the diode-array target disposed in stripes on a surface of the substrate which is exposed to a light. Alternatively a high concentration layer of the same conduction type as a substrate of the diode-array target is provided on a surface of the substrate which is exposed to a light, and a plurality of first and second filtering apparatus is disposed in parallel stripes on the high concentration layer.

Furthermore, according to this invention, a color television camera employs only a color pick-up tube and an image pick-up tube for the luminance signal, wherein the above discribed photo-diode array target is used in the color pick-up tube.

Further objects and features of this invention will be understood from the descriptions in connection with embodiments refering to the annexed drawings.

BRIEF DESCRIPTIONS OF THE DRAWINGS

Figure 3A:
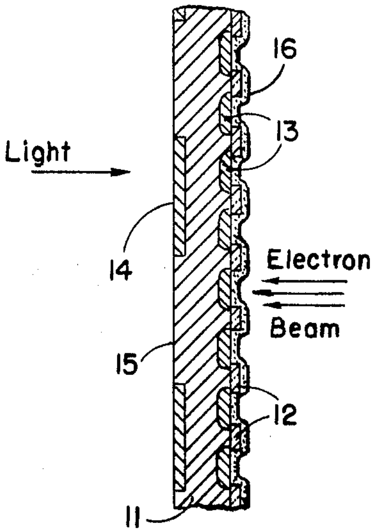
Figure 3B:
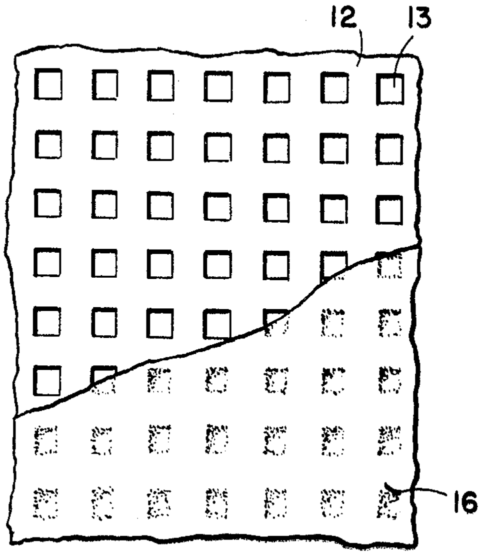
Figure 4:
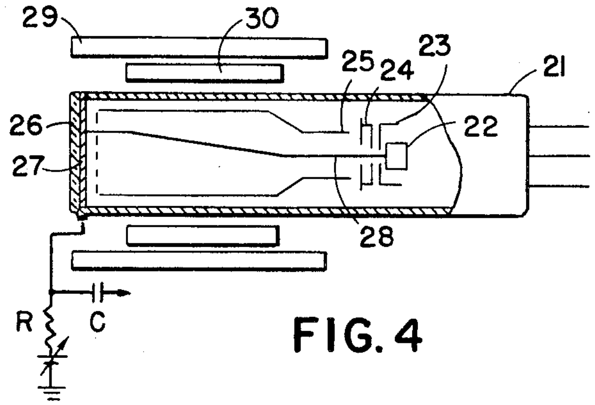
Figure 5:
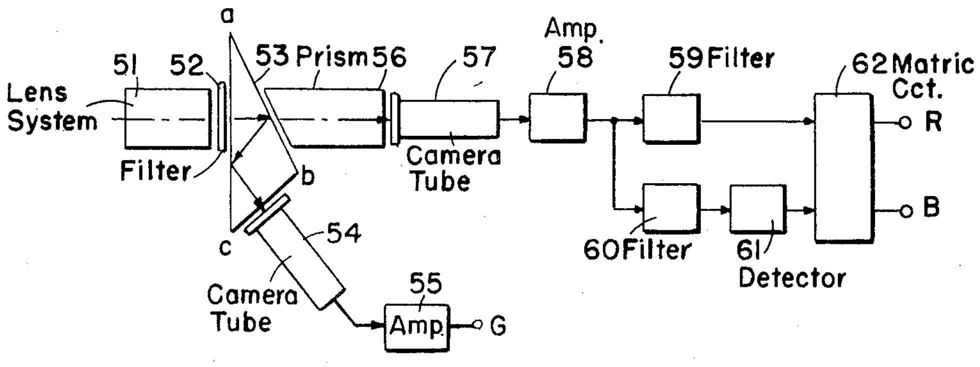
Figure 6A:
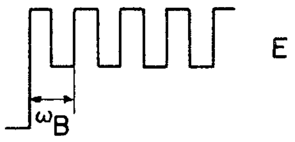
Figure 6B:
Figure 6C:
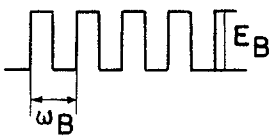
Figure 7:
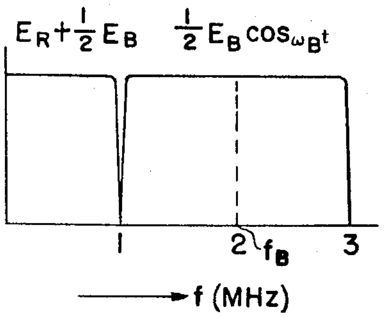
Figure 12A:
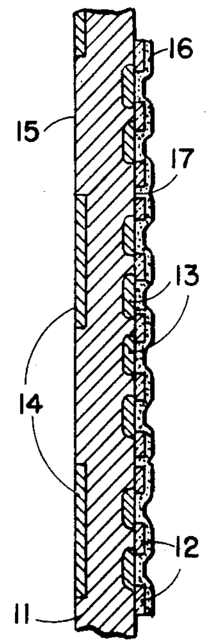
Figure 12B:
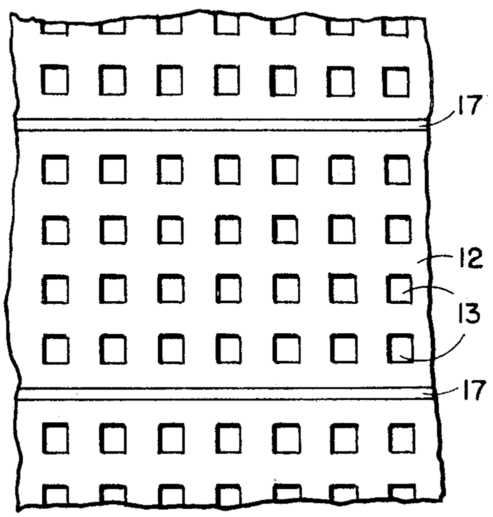
Figure 13:
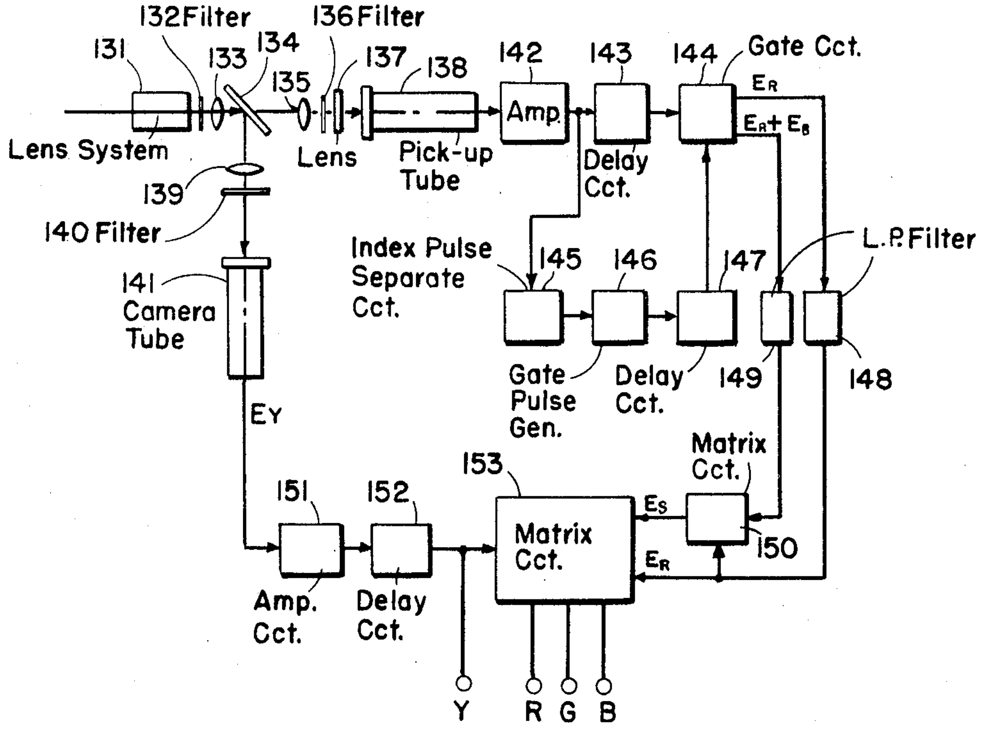
Figure 14A:
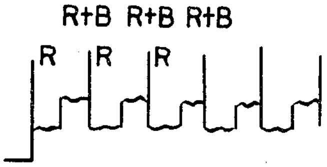
Figure 14B:
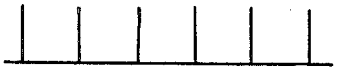
Figure 14C:
Figure 14D:
Figure 14E:
Figure 14F:
Figure 15A:
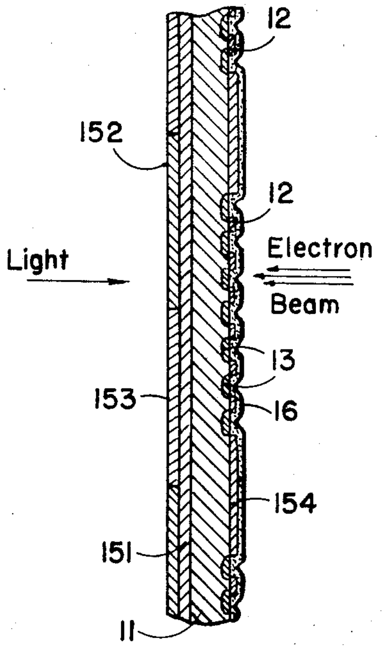
Figure 15B:
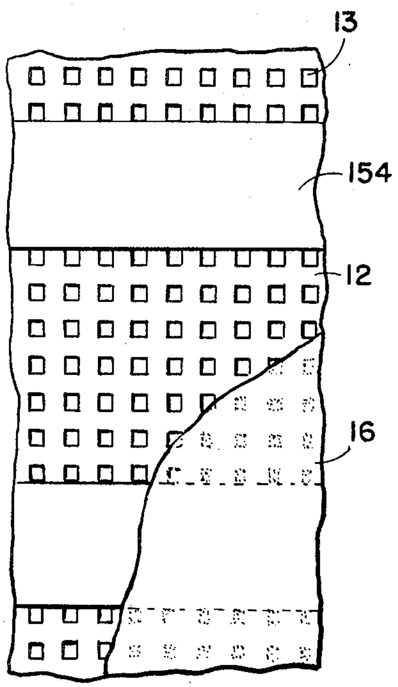
Figure 16:
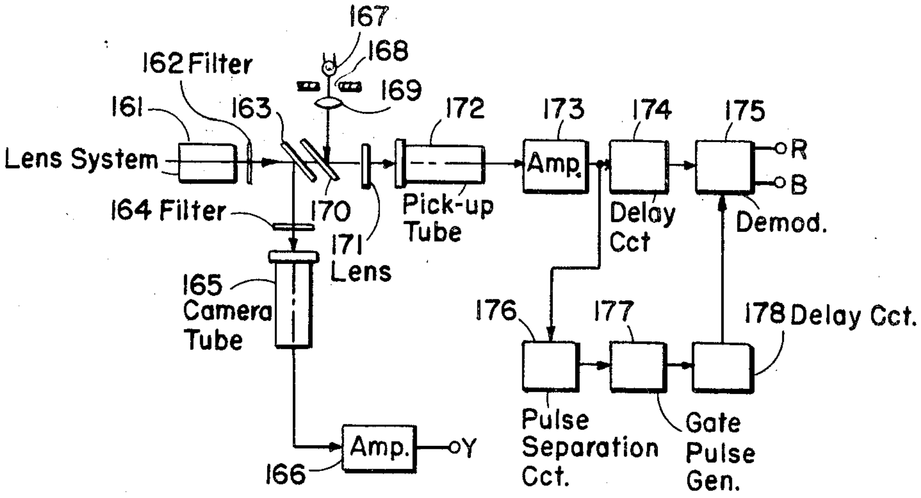

FIG. 1*a* is a cross-sectional view of a known silicon photo-diode array target, FIG. 1*b* is a cross-sectional view of a modification of the target in FIG. 1*a*, FIG. 2 graphically shows the spectral response of the target in FIG. 1*a* for various thickness of the substrate, FIG. 3*a* and FIG. 3*b* show an embodiment of a target according to this invention in a cross-sectional view, and in plan view with a part cut away, respectively, FIG. 4 shows a cross sectional view of a color pick-up tube using a target according to this invention, FIG. 5 shows a schematic diagram of a first embodiment of a color television camera according to this invention, FIGS. 6*a* – 6*c* show the waveform of signals at various points in the embodiment in FIG. 5, FIG. 7 shows the characteristics of filters used in the embodiment in FIG. 5, FIG. 8 shows a schematic diagram of a second embodiment of a color television camera according to this invention, FIGS. 9*a* – 9*f* show the waveform of signals at various points in the embodiment in FIG. 8, FIGS. 10 and 11 are schematic diagrams of additional embodiments of a color television camera, FIGS. 12*a* and 12*b* depict a further embodiment of a target according to this invention in cross-sectional view, and in plan view omitting a resistor layer, respectively, FIG. 13 shows a schematic diagram of an embodiment of a color television camera using a color pick-up tube with the depicted in FIGS. 12*a* and 12*b*, FIGS. 14*a* – 14*f* show waveforms of signals at various points in the embodiment in FIG. 13, FIGS. 15*a* and 15*b* show a further embodiment of a target according to this invention in a cross-sectional view, and in plan view with a portion therefore cut-away, respectively, FIG. 16 shows a schematic diagram of a color television camera using a color pick-up tube with the target shown in FIGS. 15*a* and 15*b*, and FIGS. 17*a* – 17*f* show waveforms of signals at various points in the camera shown in FIG. 16.

DETAILED DESCRIPTIONS OF PREFERRED EMBODIMENTS

Referring to FIG. 1*a*, in which a known silicon diode-array type target is illustrated in cross-sectional view, the target comprises a *n*-type silicon substrate 1, an insulator layer 2 having plural perforations arranged in a mosaic manner on one surface thereof and plural p-type 3 regions formed on the substrate 1 by diffusing *p*-type impurities into the substrate 1 through the perforations of the insulator layer 2.

By the use of this diode-array-type target, there is obtained a pick-up tube having excellent properties of a high sensitivity, a low degree of lag, non-burning and so on.

The spectral response of this diode-array-type target depends upon the thickness of the silicon substrate 1. FIG. 2 shows graphically the relationship between sensitivity, light wavelength, and substrate thickness. From FIG. 2, it will be understood that the sensitivity increases from the infra-red region, to the visible light region with a thinner substrate.

In a practical construction, it is comparatively easy to obtain a sensitivity to the long wavelength band (or red) within the visible light region, but it is very difficult to obtain a sensitivity to the to short wavelength band (or blue) within the visible light region. This is explained as follows. The majority of the light projected on the target surface is converted into plural hole-electron pairs within a 0.5 $\mu$ depth from the target surface. The major part of holes produced just beneath of the target surface drift to the target surface, and are eliminated by surface recombination, because the energy band is bent upward at the etched surface of the *n*-type silicon substrate.

If a thin $n^+$-layer 4 less than 0.5 $\mu$ thick is formed at the surface of the substrate 1 at the light projection side, as shown in FIG.1*b*, the energy band is bent downward so that an internal electric field makes holes drift to the P-N junctions. Thus the target is sensitive to light of a short wavelength band within the visible light region.

This invention provides photo-diode array targets for a color pick-up tube in color television camera using only two tubes, by utilizing the phenomena above described in relation to FIGS.1*a*, 1*b* and 2.

Referring to FIG.3, in which a photo-diode array target according to this invention is illustrated, the target comprises an *n*-type silicon substrate 11; an insulator layer 12 having perforations disposed in a mosaic manner (pattern) on one surface of the substrate; *p*-type regions 13 formed on the surface of the substrate 11 by diffusing *p*-type impurities through the perforations of the insulator layer 12, $n^+$-regions 14 in stripes formed on the other surface of the substrate 11 by diffusion, *n*-type regions 15 in stripes remained on the other surface of the substrate, and a resistive layer 16 formed on the insulator layer 12 and *p*-type regions 13 while covering them.

It will be understood that a plurality of diodes are formed on the substrate 11.

The resistive layer (on resistive sea) 16 has an areal resistance of $10^{13}$ – $10^{14}$ Ω/square, centimeter and is employed to discharge electrons produced on the insulator layer 12 by electron-beam scanning during the interval between two sequential electron-beam scanning cycles of operation.

Referring to FIG.4, in which an example of a camera tube using the target shown in FIG.3 is illustrated in cross-sectional view, this camera tube is similar to known camera tubes except for the construction of the target. This camera tube comprises a vacuum envelope 21, a thermionic cathode 22, a first grid electrode (control grid) 23, a second grid electrode (accelerator) 24, a third grid electrode (beam-focus electrode) 25, a face plate 26, a photo-diode array target 27 shown in FIG.3, a focussing coil 29 and a deflection coil 30. Electrodes 22 – 25 and the target 27 are contained in the envelope 21 as shown in FIG.4. The target 27 is oriented in such manner that the stripes 14 and 15 are perpendicular to the direction of the horizontal scan.

The substrate of the target 27 is biased positively with respect to the cathode of the electron gun.

The electron beam 28 from the cathode 22 is focused on the gun side surface of the target 27 i.e., the side of the target 27 disposed toward the electron gun, by means of the focusing coil 29, and is scanned by the deflection magnetic field of the deflection coil 30. Thus, the gun side surface potential of the target 27 is stabilized at approximately the cathode potential and the diodes are reverse biased at the full target bias potential. At this time if light is projected on the surface of the target 27, diodes on the target 27 discharge in accordance with the intensity of the projected light. When the scanning electron beam charges the diodes, current flows via the resistor R in an amount which is corresponding to the intensity of the light.

If an image of an object is focused onto the surface of the target 27, the current varies in accordance with the image intensity at various points on the target 27, with the scan of the electron beam. Accordingly, an electric signal characterizing the image may be obtained by extracting a measure of the current, as through a capacitor C.

The target 27 has stripes of $n^+$-type regions of less than 0.5 $\mu$ thickness 14 and stripes of n-type regions 15 on the surface on which light is projected, as shown in FIG.3. The target is sensitive to only red light components in conjunction with the light irradiating the stripes 15, and is sensible to the entire visible light spectrum in conjunction with the light irradiating the stripes 14. Accordingly, the current flowing through the resistor R, or the electric signal obtained through the capacitor C, comprises information regarding the of intensities of red image component, and of entire visible light spectrum in connection with the light projected on the surface of the target 27, and these two intelligence signals follow one after the other on a time basis.

To describe the operation of the target 27 in particular detail, it is to be understood that the substrate thickness is selected in a range between 10 and 15 microns to provide the desired sensitivity and resolution. The peak spectral sensitivity shown in FIG. 2 for a substrate thickness of 10 microns is about 0.6 micron, which appears yellowish orange to the human eye. More particularly, the silicon substrate 11 absorbs the light of shorter wavelengths at the portions of the smaller depths from the surface upon which the light is incident, and which is provided by etching (hence, "the etched surface" in line 13 of page 6) in the manner known in the art. If the substrate 11 is *n* type, the minority carriers or holes generated by the light absorbed by the substrate 11 at smaller depths tend to travel to the surface on which the irradiant light is projected rather than towards the *p-n* junctions 11–13 to provide the output current in response to the electron beam scan. As a result, the target 27 has little sensitivity to the spectral components of incident light of shorter wavelengths, such as blue components, to provide responses to the red components at the portions of the exposed stripes 15. On the other hand, it will be remembered that a target illustrated with reference to FIG. 1*b* is sensitive to shorter wavelengths. More specifically, the $n^+$ stripes formed in the substrate 11 produce electric fields along the gradient of the impurity concentration, namely, in a sense from the surface on which the light is to be incident to the interface on which the *p-n* junctions 11-13 are arranged. The electric fields guide the minority carriers effectively toward the *p-n* junctions to provide photoelectric currents. As a consequence, the target 27 is sensitive to the entire visible range at the portion of the $n^+$ stripes 14. In summary, the target 27 is sensitive to red, green, and blue component of the light incident on the $n^+$ stripes 14 and sensitive only to red component of the light incident on the exposed stripes 15. To be more exact, the target 27 has a little sensitivity to the green component at the bare stripes 15.

It will be understood from above description that the camera tube shown in FIG. 4 may be uSed as a color pick-up tube in a two tube type color television camera.

Referring to FIG.5, in which a color television camera using a camera tube as shown in FIG.4 is schematically shown, light from viewed objects passes through an optical lens system 51 into an infra-red ray cut-off filter 52, at which infra-red components are cut-off, and, thereafter, passes through a prism 53. At the prism 53 the incident light is separated into a green component and a remaining component by a green reflective coating formed on the surface *a-b* of the prism 53.

The green component reflected by the green reflection coating passes within the prism 53, is totally reflected at the surface *a-c*, translates within the prism again, and is emitted from the surface *b-c*. The emitted green component is focused on a target (not shown) of a camera tube 54 which converts the green component into an electric signal. The green component signal which is amplified at a wide-band amplifier 55, such that an electric signal G corresponding to the green component of the light from the viewed image may be obtained from the output of the amplifier 55.

the camera tube 54 may be a known camera tube using a photo-diode array target, and the wide-band amplifier may be a conventional amplifier well known in this technical field, and explanation thereof is thus omitted for simplification. The remaining image components which passes through the green reflective coating on the surface b comprises red and a blue image components which are focused on a target (which is a target as illustrated in FIGS. 3 and 4) of a camera tube 57 through a prism 56. The green image component is thus obviated from the light from which the camera tube 57 produces the output signal.

The camera tube 57 has a construction described and shown with respect to FIGS. 3 and 4. The output signal from the camera tube 57 comprises information of the total amount of the combined red and blue components in the incident image, and of the amplitude of the red component (only) therein, which are arranged one after another. Thus the output signal E from the camera tube 57 has a waveform as shown in FIG.6A, and is considered as a superimposed signal formed of a red component signal $E_R$ and a blue component signal $E_B$ having respective waveforms as shown in FIGS.6B and 6C, respectively. The abscissa of each of FIGS. 6A, 6B, and 6C represents the spatial angular frequency.

Thus, the following equation (1) exists.

$$E=E_R+\frac{1}{2}E_B+\sum_{n=1}^{\infty}\frac{1}{2}E_B\cos n\omega_B t \qquad (1)$$

Where, $\omega_B$ is a spatial angular velocity, and it is supposed that a pitch in the waveform of the blue component signal as shown in FIG.6C is a spatial angular velocity.

The output signal E is applied to a low-pass filter 59, through which only signal components represented by first and second terms ($E_R + \frac{1}{2} E_B$) of equation (1) are passed, and is applied to a band-pass filter 60 through which only signal component represented by the third term ($\frac{1}{2} E_B \cos \omega_B t$) of equation (1) is passed. The respective output signals Er and Eb from the filters 59 and 60 are given as $$Er = E_R + \tfrac{1}{2} E_B$$

and $$Eb = \tfrac{1}{2} E_B \cos \omega_B t.$$

The output signal Er from the low-pass filter 59 is applied to a matrix circuit 62, directly. The output signal Eb from the band-pass filter 60 is applied to an envelope detection circuit 61. The output signal $Eb'$ from the circuit 61 is equal to the signal $E_B$ and is applied to the matrix circuit 62.

To the matrix circuit 62 are applied the signal $Er = \frac{1}{2} E_R + \frac{1}{2} E_B$ and the signal $Eb' = E_B$, and from the circuit 62 are obtained a signal R corresponding to an image red component and a signal B corresponding to an image blue component at individual output terminals.

Thus chrominance are obtained, a luminance signal can thereby be synthesized from these three signals R, G and B by known techniques.

Providing that the low-pass filter 59 has a band-width of 1 MHz and that the band-pass filter 60 has a band-width of ±1 MHz, the center frequency $f_B$ of the band-pass filter 60 is 2 MHz, as will be understood from FIG.7.

The pitch *p* of the stripes 14 and 15 of the target shown in FIG.3 is given by the following equation, $$P = [\text{(Width of the effective area of the target)} \times \text{(Horizontal scanning frequency}/(\omega_B/2\pi) \times \text{(Effective component of horizontal scan)}].$$

Where, providing that the width of the effective area of the target is 12.7 cm, the horizontal scanning frequency is 15.75 KHz and the effective component of horizontal scan is 83.5 percent (or the fly-back time in the horizontal scan is in the ratio of 13.5 percent to the horizontal scanning time), the pitch *p* is 0.12 mm.

Referring to FIG.8, in which another color television camera using a camera tube shown in FIGS.3 and 4 is schematically shown, this color television camera is similar to the camera shown in FIG.5 except that the circuit means for obtaining a blue component signal and a red component signal from the output signal of the camera tube 57 differs from the camera in FIG.5. Similar parts are represented by similar reference numerals in FIGS.5 and 7, and a description in connection with them will be omitted for purposes of simplification.

The output signal from the camera tube 57 has a waveform as shown in FIG.9*a*, similar to that depicted as in FIG.6*a*. It will be readily understood that the difference between the waveforms is due to the difference of the light from the image objects. Thus the output signal from the camera tube 57 comprises a signal $E_R$ corresponding to the red component and a signal $E_R'$ $+ E_B$ corresponding to the total amount of red and blue components, these two signals being arranged one after another on a time axis.

The output signal of $E_R$ and $E_R' + E_B$ is amplified at an amplifier 81, and one part of the amplified signal is applied to a gate pulse generating circuit 82. At this circuit 82, the amplitude difference between $E_R$ and $E_R' + E_B$ is detected to trigger an index-pulse generating circuit, i.e., to generate the index pulses shown in FIG.9*b*. This index pulse wave is delayed and is shaped by delay and shaping circuitry in the circuit 82. Thus the sampling gate signals as shown in FIGS.9*c* and 9*d* are obtained from the circuit 82.

The sampling gate signals in FIGS.9*c* and 9*d* are applied to respective gate circuits 83 and 84. To the gate circuits 83 and 84 is applied the amplified signal of $E_R$ and $E_R' + E_B$ from the amplifier 81, which signal is sampled at respective gate circuits 83 and 84.

An output signal $(E_R' + E_B)$ obtained from the gate circuit 83 and an output signal $(E_R)$ from the gate circuit 84 are as shown in FIGS.9*e* and 9*f*, and are applied to an arithmatic circuit 85. In the arithmetic circuit 85, the signal $E_R$ is amplified to be equal to $E_R'$, and the signal $E_R' + E_B$ is reduced by the amplified signal $E_R = E_R'$ so that the blue component signal B is obtained from the operation in arithmetic circuit 85.

The output signal $E_R$ from the gate circuit 84 is derived from the output terminal thereof as the red component signal R.

Thus, three signals corresponding to primary color components are obtained. Therefore a luminance signal may be easily obtained from the chrominance signal by well known techniques. In the drawing, 86 is a known bias light means.

It has been described in connection with embodiments of the invention that a luminance signal is synthesized from a composite chrominance signal. However, a green component signal may be used for a luminance signal without synthesizing a luminance signal, because the green component is of a wavelength of the highest visual sensitivity. It is known in the prior art that the use of a green component signal for a luminance signal does not result in an inferior color picture quality. Therefore the terms "luminance signal" identifies a complete luminance signal or a green component signal in the description herein.

If a green reflection layer on the surface *a-b* of the prism 53 is replaced by a half mirror in the embodiments shown in FIGS.5 and 8, light comprising all color components is applied to the tube 54 so that from the tube 54 is obtained a luminance signal, not a green component signal. Then a blue filter should be arranged in the light path from the prism 53 to the tube 57. Different embodiments having such construction are shown in FIGS.10 and 11.

In FIGS. 10 and 11, similar parts are represented by similar reference numerals as in FIGS.5 and 8, and the numeral 100 represents the circuit for obtaining individual red and blue component signals from the output signal of the tube 57 (58 – 62 in FIG.5 or 81 – 85 in FIG.8).

Referring to FIG.10 light, which has passed through the optical lens system 51 and the infra-red ray cut-off filter 52, is delivered in two directions by a half mirror 101. The light in one direction is applied to the tube 54 to produce a luminance signal Y, and the light in the other direction is applied to a green cut-off filter 102, at which the image green component is eliminated. The remaining light passing through the filter 102, which comprises the red and blue components, is applied to the tube 57, and from the output of the tube 57 the red and blue component signals R and B are obtained by the circuit 100.

Referring to FIG. 11, prisms 111 and 112 are substituted for the half mirror 101 in FIG.10, the other constructions are similar to those of FIG.10. Therefore, any further descriptions will be omitted for simplification.

FIGS.12*a* and 12*b* show another embodiment of the photo-diode array target. FIG.12*a* is a cross-sectional view, and FIG.12*b* is a plan view in which the insulator layer 16 is omitted. This target is of a similar construction as the target in FIG. 3, except that the insulator layer 16 has slits 17, each of which extends parallel to and corresponds with to a boundary line between adjacent $n^+$-type and *n*-type striped regions 14 and 15.

In the drawing, slits 17 are provided correspondingly to alternate boundary lines. These slits 17 are for obtaining the index-pulse for deriving red and a blue component signals from the output signal of a pick-up tube, as will be described in connection with an embodiment in FIG.13.

Referring to FIG.13, in which a color television camera using the target of FIGS.12*a* and 12*b* for the target of a color pick-up tube is schematically shown, incident light passes through an optical lens system 131 into an infra-red ray cut-off filter 132, at which infra-red light is removed. The output light from the filter 132 passes through a lens system 133, and is delivered to two output directions. The light in one direction is applied to a color pick-up tube 138 through a lens system 135, a green blocking filter 136 and a lenticular lens 137 to obtain red and blue image component signals.

The light in the other direction is applied to a conventional camera tube 141 through a lens system 139 and an neutral density filter for adjusting the amount of the light to obtain a luminance signal $E_Y$.

The target of the color pick-up tube 138 is the target in FIGS.12*a* and 12*b*.

The output signal from the tube 138 has a waveform as shown in FIG.14A and comprises a signal $E_R$ corresponding to a red component and a signal $E_R + E_B$ corresponding to the total amount of red and blue components, which alternately occur, as in the embodiments shown in FIGS.5 and 8. The output signal for the FIG. 18 embodiment further comprises index-pulse signals $I_P$ due to the existence of slits 17 which are not present in the embodiments of FIGS.5 and 8.

The output signal from the tube 138 is amplified at an amplifier 142, and, thereafter, is applied to a delay circuit 143 and a gate circuit 144. The index pulses are separated from the output signal from the amplifier 142, as shown in FIG.14*b* at a index pulse separate circuit 145. Thereafter, the pulses are applied to a gate-pulse generator 146 to generates gate pulses as shown in FIGS.14*c* and 14*d*. The gate pulses are delayed at a delay circuit 147 and, thereafter, are applied to the gate circuit 144 to control the signal component separating operation of the gate circuit.

The signal $E_R$ from the gate circuit 144, which has a waveform as shown in FIG.14e, is applied to matrix circuits 150 and 153 through a low-pass filter 148. The signal $E_R + E_B$ from the gate circuit 144, which has a waveform as shown in FIG.14*f*, is applied to the matrix circuit 150 through a low-pass filter 149. At the matrix circuit 150, signal $E_B$, corresponding to a the blue video component is derived from the signals $E_R$ and $E_R + E_B$, and then the signal $E_B$ is applied to the matirx circuit 153.

The luminance signal $E_Y$ from the tube 141 is applied to the matrix circuit 153 through an amplifier circuit 151 and a delay circuit 152. At the matrix circuit 153 the signal $E_G$ corresponding to a green component signal is derived from three signals $E_Y$, $E_B$ and $E_R$, for example, by the following equation in the NTSC system.

$$E_Y = 0.33E_R + 0.59E_G + 0.11E_B$$

$$E_G = E_Y – 0.33E_R - 0.11E_B \mathbf{10.59}$$

Therefore, green, red and blue component signals G, R, B, or a chrominance signal, and a luminance signal can be obtained from this camera.

Referring to FIGS.15*a* and 15*b*, further embodiment of a target according to this invention is illustrated in a cross-sectional view, and in a plan view in which a part is cut away. This this target is different from the target in FIG.3 in that the $n^+$-type layer 151 is provider over entire surface of the substrate 11. Blue blue-pass filters 152 arranged in stripes, each having a center wavelength of 4,500A, and red-pass filters 153 arranged in stripes, each having a center wavelength of 6,000A, are alternately arranged and adjacently disposed on the surface of the $n^+$-type layer in parallel. The insulator layer 12 has regions 154 in stripes corresponding to alternating boundaries between adjacent filters 152 and 153, in which regions no perforation is provided. Also, *n*-type regions are not provided on the surface regions of the substrate 11 which engage with the stripe regions 154 of the insulator layer 12. The other details of construction of this target is similar to the target of FIG.3.

Figures 17A, 17B, 17C, 17D, 17E, 17F:
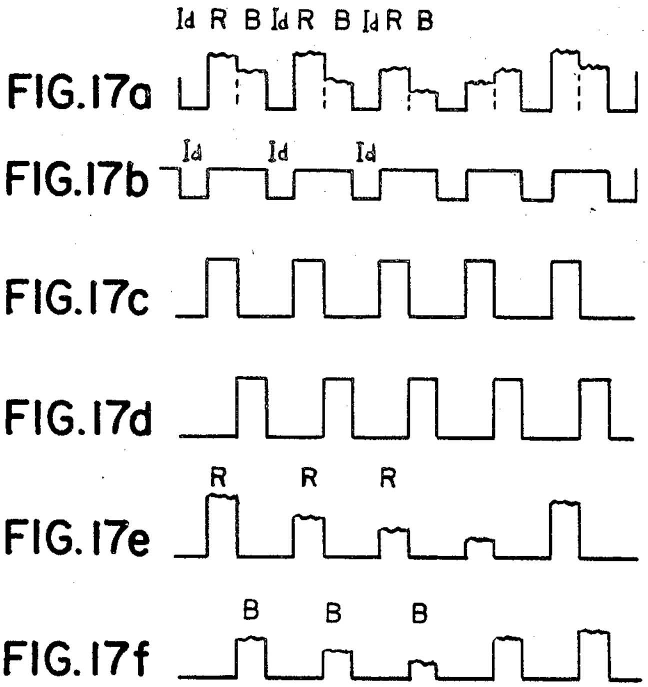

This target may be used for the target 27 of the color pick-up tube in FIG.4. In the case, the output signal from the tube comprises a black index-pulse signal $I_n$, a red component signal $E_R$ and a blue component signal $E_B$, which are sequentially arranged on a time basis, as shown in FIG.17*a*. This will be readily understood in view of the construction of the target above described.

FIG.16 shows a schematic diagram of an embodiment of a color television camera using the target in FIG.15 for a target of a color pick-up tube. Referring to FIG.16, the light, which has passed through an optical lens system 161 and an infra-red ray cut-off filter 162, is delivered to two output directions by a half mirror 163. The light in one direction is applied to a conventional camera tube 165 through a neutral density filter 164 for controlling the amount of the light to produce a luminance signal Y, and the output signal of the camera tube 165 is amplified by an amplifier 166. Thus a luminance signal Y is obtained from the amplifier.

The light in the other output direction from the mirror 163 is applied to a color pick-up tube 172 through a lenticular lens 171 for vignetting the image projected on a target of the tube 172. A lamp 167, an aperture 168, a lens 169 and a half mirror 170 comprise a system for providing a bias light, and may be omitted if desired.

The target of the tube 172 is the target shown in FIG.15, so that the output signal from the tube 172 is as shown in FIG.17*a*. This output signal is applied to a delay circuit 174 and a pulse separation circuit 176 through an amplifier 173. The output signal from the delay circuit 174 is applied to a demodulator 175.

At the pulse separation circuit 176, the black index signal is extracted from the input signal and the index pulse signal as shown in FIG.17*b* is applied to a gate-pulse generation circuit 177 to produce gate-pulse signals as shown in FIGS.17*c* and 17*d*. The gate pulse signals are applied to the demodulator 175 through a delay circuit 178, so that a red component signal R and a blue component signal B are individually obtained from the demodulator 175 under control of the gate-pulses.

The signals R and B are shown in FIGS. 17e and 17f, respectively. Thus, a chrominance signal is obtained in this embodiment.

The various circuits used in the several embodiments of the invention but neither described nor shown in any embodying construction, are known in the prior art, and the above description will be sufficient to those skilled in the television camera art to fully practice the invention.

This invention has been described in connection with particular embodiments thereof, which are presented only for purposes of description, and do not restrict the invention. It will be clear that various modifications and variations can be effected within the scope of this invention.

What we claim is:

1. A color television camera using two camera tubes, one tube being a color pick-up tube for obtaining a composite chrominance signal comprising individual signals corresponding to respective first and second colors components of a three primary color set, the other tube being an image pick-up tube for obtaining a luminance signal, said color pick-up tube having a target comprising
a semiconductor single crystal substrate of a first conduction type,
an insulator layer provided on the surface of one side of said substrate,
a plurality of perforations arranged in a mosaic pattern in said insulator layer,
a plurality of regions of a second conduction type which are provided on said one side surface of said substrate in registration with said perforations,
a resistive film provided on said insulating layer about said one substrate surface and engaging said second conduction type regions through said insulator layer perforations, and
a plurality of high concentration regions of first conduction type impurities arranged in parallel stripes on the other side surface of said substrate;
said target being arranged in said color pick-up tube in such manner that said other surface provided with said plurality of high concentration regions may be exposed to light and that the longitudinal direction of each of said high concentration striped regions is perpendicular to a horizontal scan over said resistive layer by an electron beam;
means for removing a third color component of said three primary colors from light originating from an image and for projecting light comprising said first and second color components onto said color pick-up tube,
means for projecting a light including said third component onto said image pick-up tube for obtaining a luminance signal, and circuit means for obtaining from a signal at the output of said color pick-up tube including a first signal portion corresponding to both of first and second color components, and a second signal portion corresponding to one of said first and second color components, two individual signals respectively corresponding to first and second color components.

2. The color television camera claimed in claim 1, in which said circuit means comprises;

filter means for obtaining only said second signal component from said signal from the output of said color pick-up tube, and matrix circuit means for individually producing said two signals corresponding to said respective color components by receiving said signal having said first and second signal components, and said signal from said filtering means.

3. The color television camera claimed in claim 1, in which said circuit means comprises;

circuit means for generating an index-pulse signal responsive to amplitude differences between said first and second signal components of said first signal portion, first circuit means coupled to said signal from said color pick-up tube and said index-pulse signal for deriving said first signal portion by sampling said signal from said color pick-up tube in accordance with said index-pulse signal, second circuit means coupled to said signal from said color pick-up tube and said index pulse signal for deriving said second signal portion by sampling said signal from said color pick-up tube in accordance with said index-pulse signal, and an arithmetic circuit for obtaining a signal corresponding to the other of said first and second color component from said first and second signal portions derived by said first and second circuit means.

4. The color television camera claimed in claim 1, in which said insulator layer of said target of said color pick-up tube further comprises slits extending at a boundary of each of said plurality of high concentration regions whereby an index-pulse signal may be included in the output signal from said color pick-up tube.

5. The color television camera claimed in claim 4, in which said circuit means comprises;

first circuit means for deriving said index-pulse signal from said signal from said color pick-up tube, second circuit means for separating said signal from said color pick-up tube into said first signal portion and second signal portion by sampling said signal from said tube in accordance with said index-pulse signal from said first circuit means, and third circuit means for deriving a signal corresponding to the other of said first and second color components from said first and second signal portions from said second circuit means.

6. A color television camera using two camera tubes, one tube being a color pick-up tube for obtaining a chrominance signal comprising individual signals respectively corresponding to first and second colors components of a three primary color set, the other tube being an image pick-up tube for obtaining a luminance signal, said color pick-up tube having a target comprising;

a semiconductor single crystal substrate of a first conduction type, a high concentration layer of said first conduction type provided on a surface of one side of said substrate, a plurality of first and second striped light filtering means alternately arranged in parallel about said high concentration layer, said first light filtering means passing only light of a first color component of said three primary colors and said second light filtering means passing only light of a second color component of said three primary colors, a plurality of regions of a second conduction type arranged in a mosaic pattern on the surface of the other side of said substrate other than striped regions corresponding to alternate boundary lines between said first and second filtering means, an insulator layer provided on said other side surface of said substrate, a plurality of perforations in said insulator means in registration with said plurality of regions of a second conduction type, and a resistive film provided on said insulator layer coating the entire surface thereof and engaging said second conduction type regions through said perforations in said insulator means;

said target being arranged in said color pick-up tube such that said one side surface provided with said plurality of first and second filter means may be exposed to light and that the longitudinal direction of each of said first and second filter means is perpendicular to a horizontal scan on said resistive layer by an electron beam, and circuit means for obtaining from a signal including a first signal portion corresponding to said first color component, a second signal portion corresponding to said second color component, and an index-pulse signal component produced at an output of said color pick-up tube, said two individual signals.

7. The color television camera claimed in claim 6, in which said circuit means comprises;

first circuit means for deriving said index-pulse signal from said signal from said color pick-up tube, and second circuit means for individually deriving said first signal component and said second signal component from said signal from said color pick-up tube by sampling said output of said color pick-up tube in accordance with said index-pulse signal from said first circuit means.

8. In combination in a color television camera, a color tube including a semiconductor target, said target comprising a semiconductor substrate of a first conductivity type, said substrate having first and second surfaces, a spaced array of regions of a second conductivity type disposed about said first surface of said substrate, and a cyclically repeating pattern of light color filtering means oriented in a first direction at said second surface of said substrate; electron gun means for directing an electron beam toward said first substrate surface; and means for repetitively sweeping said electron beam in a direction orthogonal to said first direction.

9. A combination as in claim 8 further comprising optic means for directing a light pattern corresponding to a viewed image toward said second substrate surface.

10. A combination as in claim 9 further comprising means for deriving an output signal from said target during electron beam sweeping, said signal being of time division form comprising plural alternating time slots each bearing differing information descriptive of the color content of the viewed image; and plural detector means for recovering plural video chrominance signals.

11. A combination as in claim 10 wherein said target further comprises insulator and resistive layer means about said one substrate surface.

12. A combination as in claim 10 wherein said color filter means comprises spaced parallel filter stripes of a like spectral passing characteristic.

13. A combination as in claim 10 wherein said color filter means comprises contiguous, alternating parallel filter stripes of differing, cyclically repeating spectral passing characteristics.

* * * * *